(12) United States Patent
Masood et al.

(10) Patent No.: US 9,978,048 B2
(45) Date of Patent: *May 22, 2018

(54) METHODS AND SYSTEMS FOR CONNECTED SALES ASSOCIATE SERVICES

(75) Inventors: Rafeh Masood, Barlett, IL (US); Gina Hoffmann, Geneva, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/483,959

(22) Filed: May 30, 2012

(65) Prior Publication Data

US 2013/0325891 A1 Dec. 5, 2013

(51) Int. Cl.
*G06F 17/30* (2006.01)
*G06Q 20/20* (2012.01)
*G06Q 10/10* (2012.01)
*G06Q 30/06* (2012.01)

(52) U.S. Cl.
CPC ....... *G06Q 20/20* (2013.01); *G06F 17/30864* (2013.01); *G06Q 10/10* (2013.01); *G06Q 30/06* (2013.01)

(58) Field of Classification Search
CPC .. G06Q 10/10; G06Q 10/087; G06Q 20/0453; G06Q 20/3227; G06Q 20/3278; G06Q 20/325; G06Q 20/209; G06Q 20/202; G06Q 20/20; G06Q 20/12; G06Q 20/10; G06Q 30/06; G06Q 30/02; G06F 17/30864; G06F 17/30867
USPC .............. 707/769, 999.003; 705/14.1, 14.38, 705/14.65, 14.16
See application file for complete search history.

(56) References Cited

U.S. PATENT DOCUMENTS

| | | | |
|---|---|---|---|
| 7,174,312 B2 * | 2/2007 | Harper et al. .................. | 705/35 |
| 8,254,961 B2 * | 8/2012 | Moon et al. ............... | 455/456.3 |
| 8,566,167 B2 * | 10/2013 | Munjal .......................... | 705/16 |
| 2003/0160809 A1 * | 8/2003 | Marion ......................... | 345/700 |
| 2004/0111360 A1 * | 6/2004 | Albanese ....................... | 705/38 |
| 2004/0148226 A1 * | 7/2004 | Shanahan ...................... | 705/26 |

(Continued)

OTHER PUBLICATIONS

Carl J. Debono et al., A secure wireless point of sale system, 2011, IEEE, 1-4.*

(Continued)

*Primary Examiner* — Jean B Fleurantin
(74) *Attorney, Agent, or Firm* — McAndrews, Held & Malloy, Ltd.

(57) ABSTRACT

A method and system for providing a connected sales associate service application via a mobile device. The application provides for an integrated platform upon which various tools for providing support to a sales associate are built. The application includes a database of information regarding the operation of a retail establishment, and a database of reference materials. The application provides a user interface for allowing several sales associate to access a central server for the retail establishment on multiple mobile devices. The user interface displays information regarding sales and inventory information and reference materials for products, such as user's manuals, which enable the sales associate to answer questions posed by customers. A sales associate can thus search for and find all store products which meet a customer's specifications.

20 Claims, 10 Drawing Sheets

(56) References Cited

U.S. PATENT DOCUMENTS

| | | |
|---|---|---|
| 2006/0047546 A1* | 3/2006 | Taylor et al. .................... 705/7 |
| 2006/0149640 A1* | 7/2006 | Gordon et al. ................ 705/26 |
| 2007/0069014 A1* | 3/2007 | Heckel et al. ................ 235/383 |
| 2007/0276763 A1* | 11/2007 | Kleinman et al. .............. 705/64 |
| 2009/0285483 A1* | 11/2009 | Guven et al. ................ 382/181 |
| 2010/0145730 A1* | 6/2010 | Abreu .............................. 705/3 |
| 2011/0131084 A1* | 6/2011 | Shanahan .................... 705/14.4 |
| 2011/0231272 A1* | 9/2011 | Englund et al. .............. 705/21 |
| 2011/0231285 A1* | 9/2011 | Englund et al. ........... 705/26.41 |
| 2013/0110561 A1* | 5/2013 | Checketts et al. ................ 705/5 |
| 2013/0110666 A1* | 5/2013 | Aubrey ....................... 705/26.5 |

OTHER PUBLICATIONS

Sears Holdings, Business Requirements: Reference App & Search Proof of Concept; Gina Hoffmann; Jan. 20, 2012; pp. 1-5.

Sears Holdings, Business Requirements: Reference App & Search Pilot; WorkLenz ID # 13593; Gina Hoffmann; Mar. 6, 2012; pp. 1-8.

Sears Holdings, Business Requirements: Reference & Search Iteration 2—Design; WorkLenz ID # 13593; Gina Hoffmann; Apr. 2, 2012; pp. 1-9.

Sears Holdings, Business Requirements: Reference, Iteration 3—Production; WorkLenz ID # 13593; Gina Hoffmann; Apr. 18, 2012; pp. 1-5.

Sears Holdings, Business Requirements: Reference, Iteration 4—Migration; WorkLenz ID # 13593 Gina Hoffmann, Apr. 18, 2012; pp. 1-4.

* cited by examiner

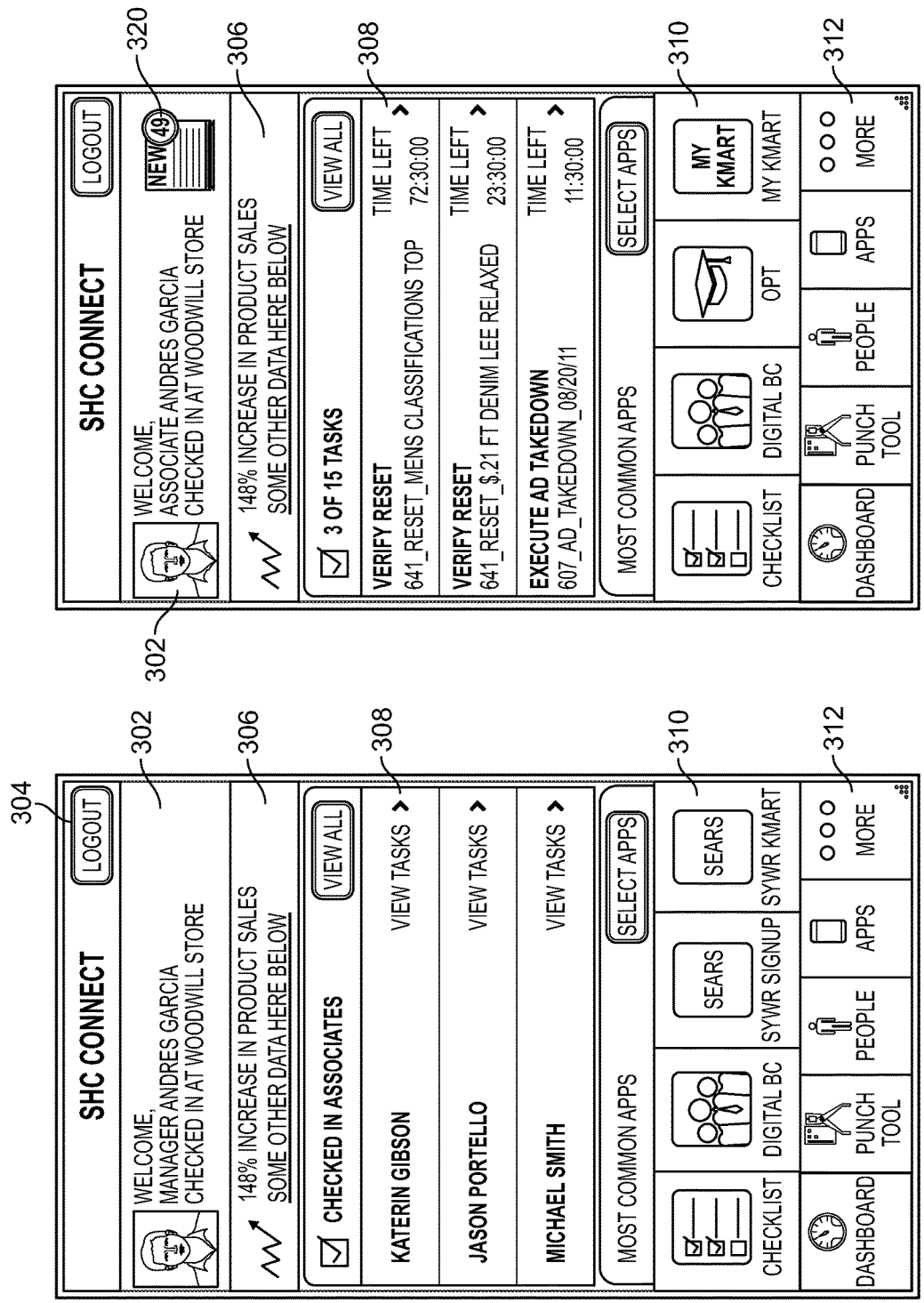

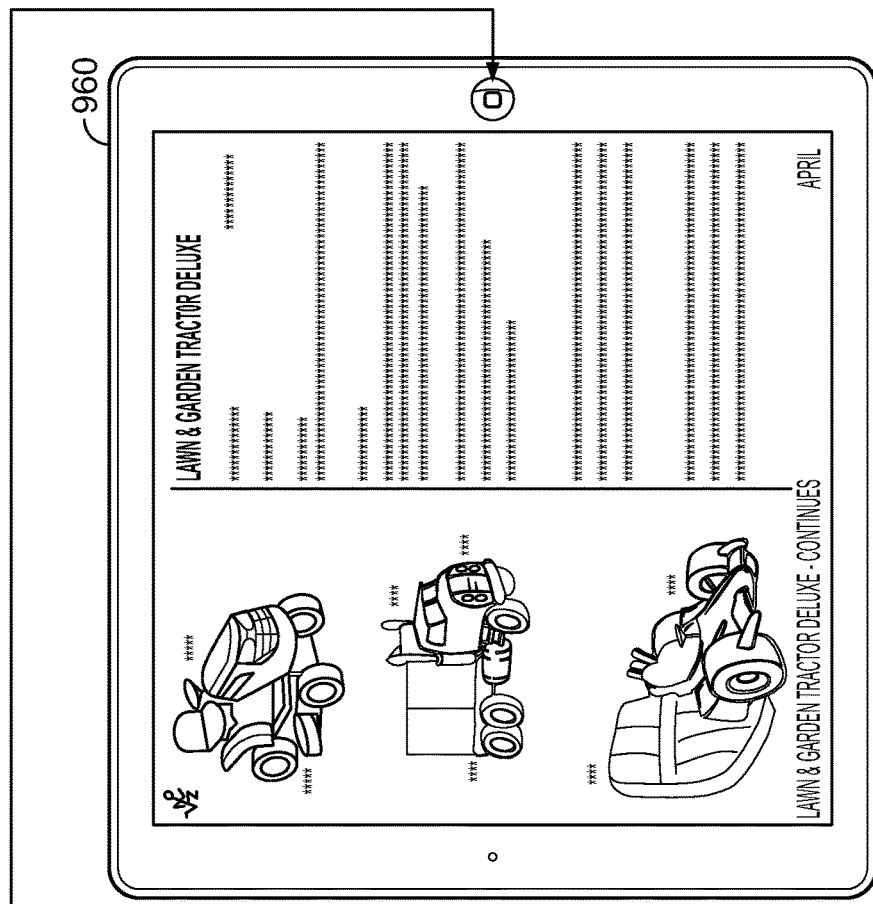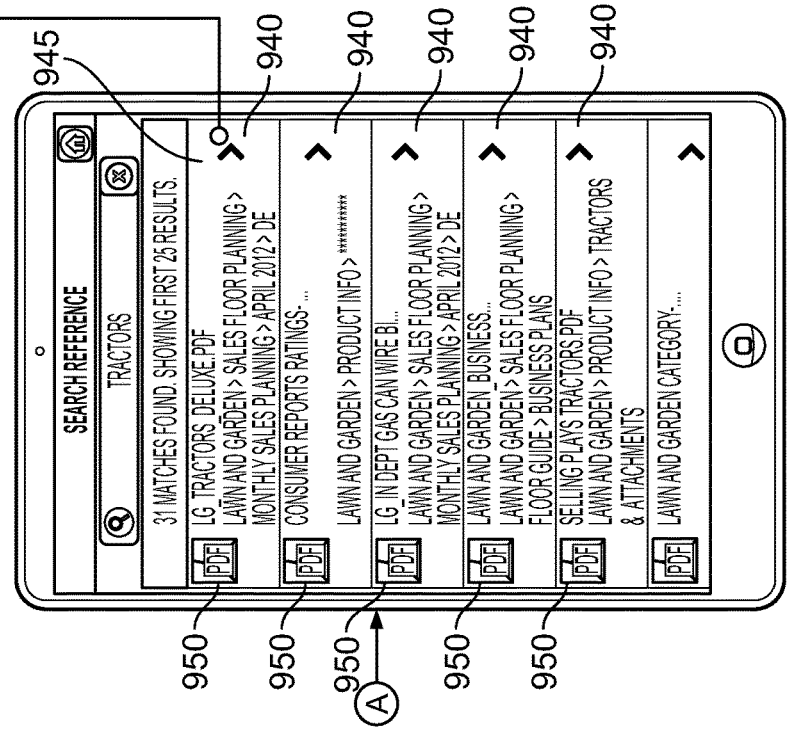
FIG. 9 (Cont.)

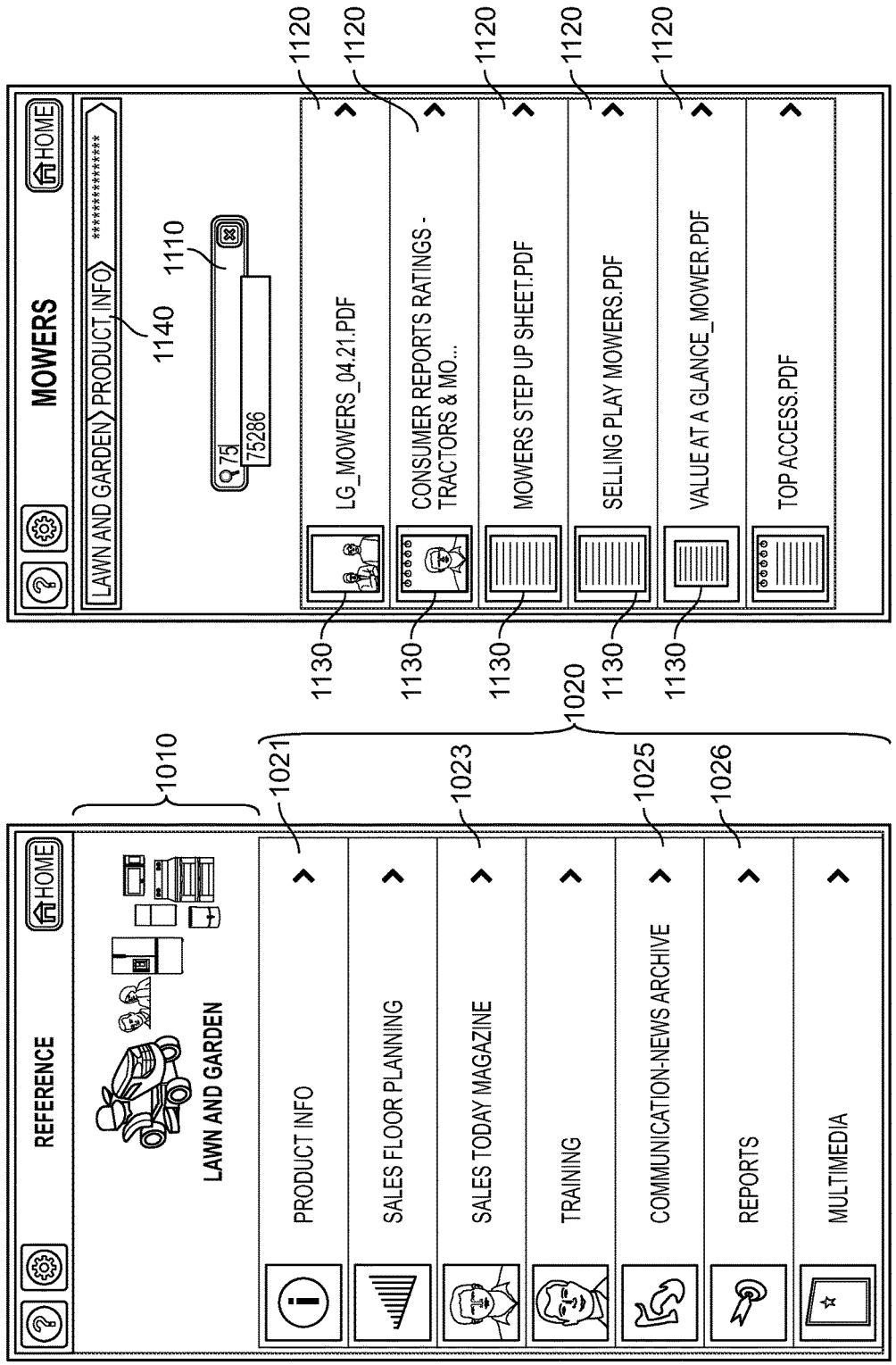

METHODS AND SYSTEMS FOR CONNECTED SALES ASSOCIATE SERVICES

FIELD OF THE DISCLOSURE

The present description relates generally to multi-channel connectivity of a sales force and more particularly to methods and systems for providing connected sales associate services.

BACKGROUND OF RELATED ART

In-store sales associates have traditionally been provided with basic in-store electronic support including, for example, point-of-sale (POS) support. Traditionally, POS support has been embodied by an in-store non-mobile cash-register that is centrally located to allow customers to pay for merchandise, and to allow sales associates to provide limited, stationary sales support, such as product lookups, sales manuals, etc.

Recent developments of robust mobile devices has lead to an implementation of a mobile platform POS support system. For example, US Patent publication No. 2011/0231272 is directed to a retail mobile POS software application that provides mobile POS support to retailers. The described system includes a scanner and iPod Touch coupled with a retail POS system, and uses a touch screen interface to POS features a salesperson would typically use to help a guest, including purchases with credit, gift and debit cards, cash, and making returns. The mobile system also combines iPod Touch features with a magnetic stripe reader, barcode scanner, and software to speed plastic and cash transactions.

For credit card and instant credit transactions, guests or purchasers, write their signature on the device using finger entry and control. Any employee who has the portable electronic device can accept cash transactions. After entering all the products and totaling the cost, the employee presses an on-screen "Cash" button to electronically open one of any number of cash drawers installed around the store. Guests (or purchasers) will continue to have the option to receive a printed or e-mailed receipt, or both.

The described mobile POS software application, however, is limited in that it is simply an extension of the traditional POS system. Today's sales associates, however, demand additional mobile access to multichannel processing and support systems to provide for enhanced sales activities. Thus, while the background systems and methods identified herein, generally work for their intended purpose, the subject disclosure provides improvements thereto, particularly by providing systems and methods for connected sales associate services by provided mobile connectivity to various sales support systems through a single integrated mobile device.

Previously, when a retail customer asked questions about specific products, sales associates would have to rely on centrally-located reference materials to determine the answer. This entailed leaving the customer to go find, for example, a user manual (usually located in the back of the store), finding the user manual among numerous similar manuals, locating the correct page with information relating to the customer's question, and returning to the customer with the answer. The present application discloses systems and methods enabling sales associates to remain with the customer at all times and answer the customer's questions by locating the user manual (and even the correct page) by searching through a database of reference materials available on the sales associates' mobile devices.

SUMMARY OF THE DISCLOSURE

In the present application, the systems and methods disclosed provide for an integrated platform upon which various tools for providing support to a sales associate are built. Specifically, the present application discloses an integrated system for electronically providing relevant sales information and/or tools to a sales associate such that the sales associates are capable of actively performing their service jobs. The system consolidates and centralizes various information and media content and places same at the fingertips of mobile device-equipped sales associates.

BRIEF DESCRIPTION OF THE DRAWINGS

For a better understanding of the present disclosure, reference may be had to various examples shown in the attached drawings.

FIG. 3 illustrates an example method by which a user may be presented with a dashboard view of the connect application.

FIG. 4 illustrates an example method by which a user with different permissions may be presented with a dashboard view of the connect application.

DETAILED DESCRIPTION OF THE DISCLOSURE

The following description of example methods and systems is not intended to limit the scope of the description to the precise form or forms detailed herein. Instead the following description is intended to be illustrative so that others may follow its teachings.

A mobile application for connecting sales associates to various service systems is disclosed hereinbelow. In general, the system provides for mobile device connectivity for a sales associate to access various retail systems. In at least one example, the disclosed invention leverages mobile technology, chat functionality, social networking, rewards, electronic catalogs, marketing and/or sales data, retail online shopping technology and/or a consumers' social connections, such as through a social media website, to enable each sales associate to provide a customize and personal shopping experience for multiple customers while maintaining their retail location mobility.

In one example, the mobile application is a hybrid application delivered on mobile devices such as an iPod and/or an iPad. This example application may service multiple store associates in multiple locations across different and/or similar retail umbrellas. Still further the example application may serve as a single point of entry for tasks, applications, information, reports, and/or other suitable programs. Still further, users of the example applications may be provided with immediate access to their daily task lists, lead management, time-clock management, social media, store statistics, store performance, etc.

In another example, the afore-mentioned hybrid application is designed to simplify users' searches for information and media content by consolidating and centralizing same within a single reference application. Such information and media content is typically categorized by business area, with common departments grouped adjacently. For example, apparel, beauty, jewelry and cosmetics products are grouped adjacently, and consumer appliances, lawn and garden products and hand tools are grouped adjacently. The reference applications enables sales associates to find relevant reference materials for such products quickly via a search bar.

Figure 1:
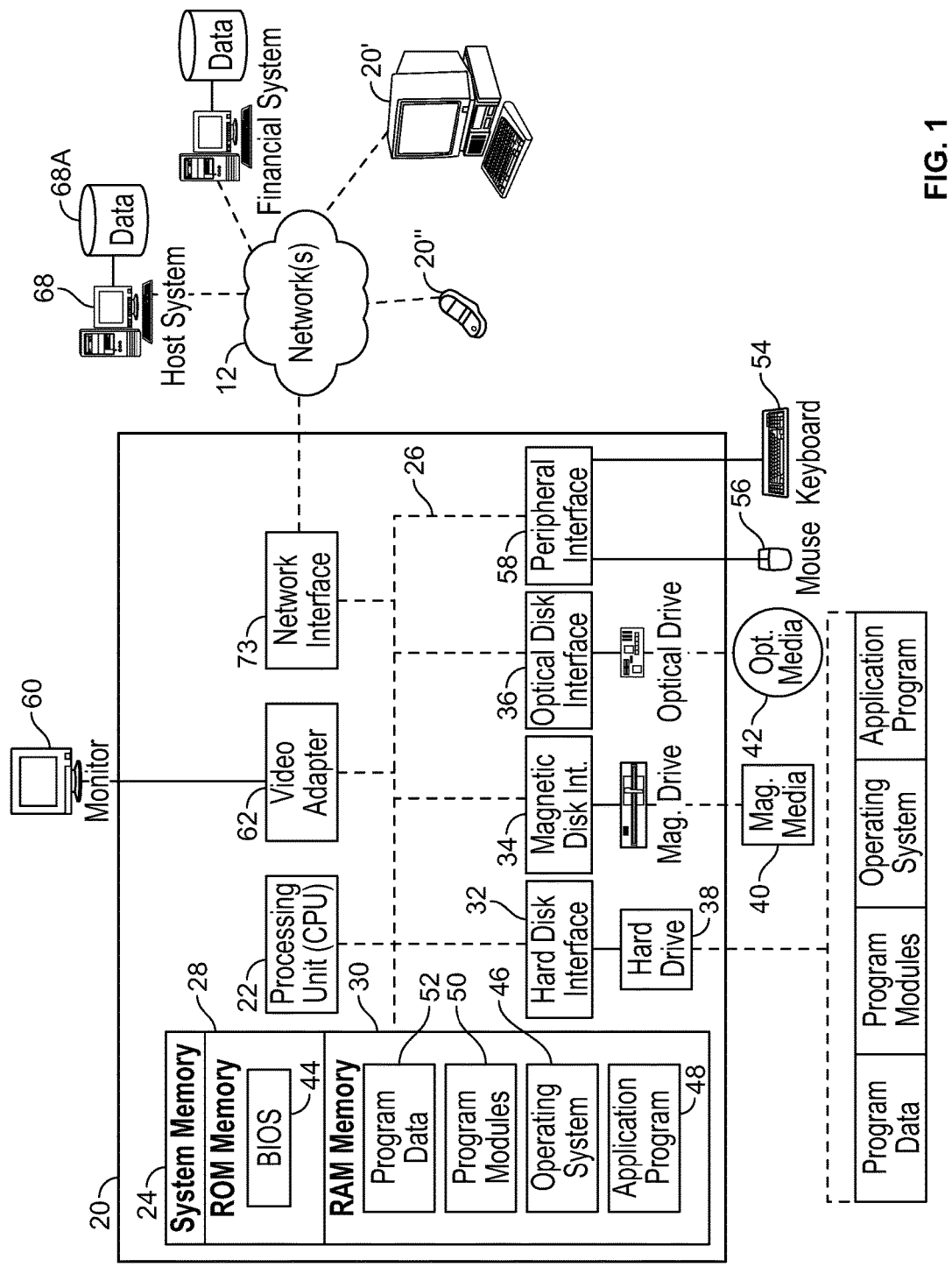
FIG. 1 illustrates in block diagram form components of an example computer network environment suitable for implementing the example methods and systems for connected sales associate service disclosed.

With reference to the figures, the following discloses various example systems and methods for providing a system for connectivity of a sales associate to a retail support network. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a retail organization to provide standard connectivity to a sales associate for accessing a host system server 68 and, among other things, for connecting to a hosted online retail environment (e.g. a retail store), a social networking site, a user profile, customer and/or sales support, other sales associates, personal shoppers, etc. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, virtual keyboard, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, coordinating a personal shopper relationship, providing a social network, storing a user's personal information, facilitating recommendations, providing access to merchandise, searching and identifying reference materials, etc.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
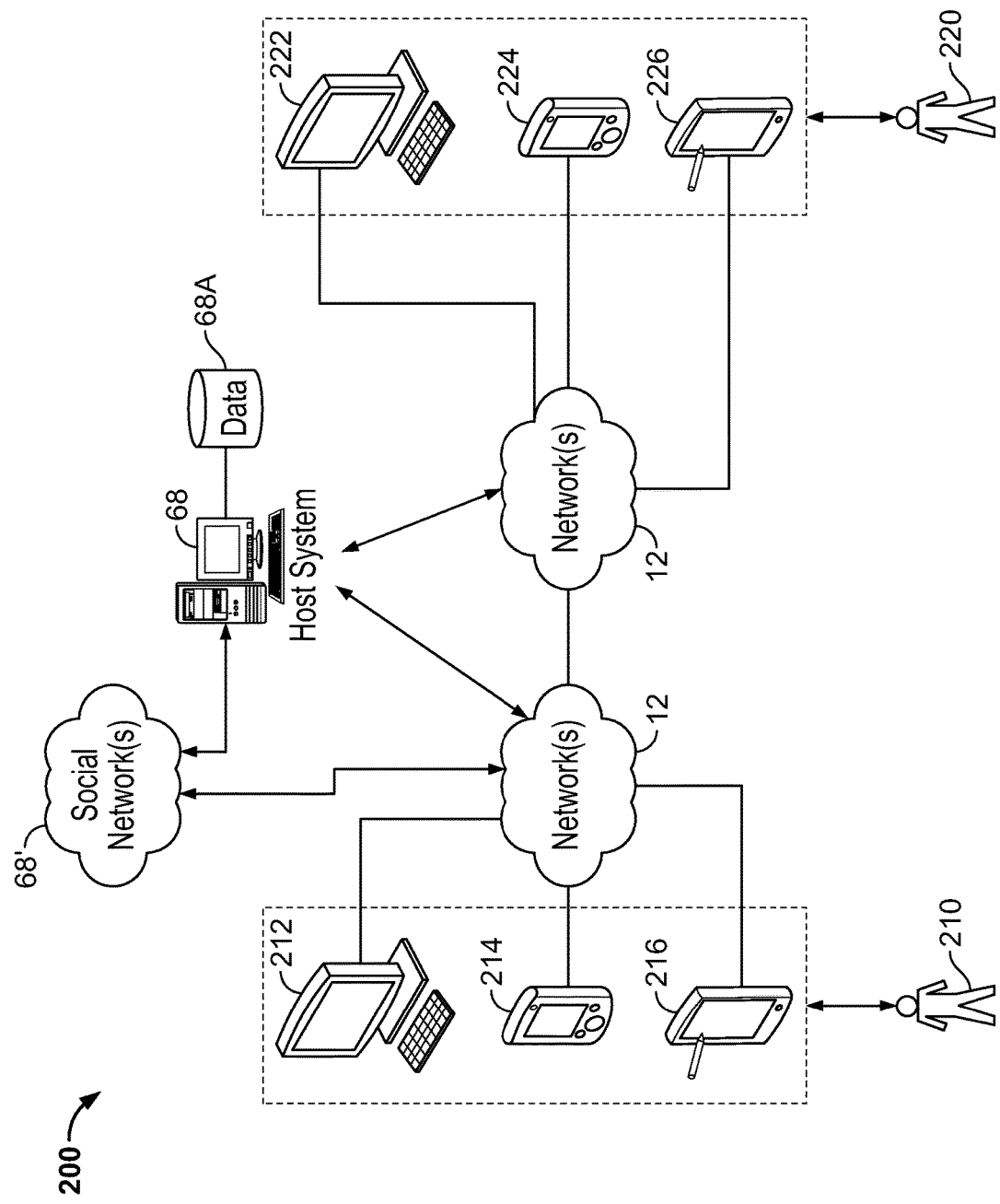
FIG. 2 illustrates an example connected sales associate system in accordance with the present disclosure.

Referring to FIG. 2, there is illustrated an overview of an example system 200 for providing multiple sales associates with access to multiple application providing connectivity to a retail environment's network in accordance with an example of the present disclosure. The system 200 is well-suited for operation on a distributed network system, such as, for example, a client-server architecture utilizing the Internet, cloud, mobile network, cellular network, or other suitable wired and/or wireless network. The system 200 may be implemented in various other communication networks and/or mediums as desired including, for example, a localized, non-distributed network.

Generally speaking, the system 200 is operable to facilitate online connectivity of multiple sale associates to various in-store applications as well as networked and/or non-networked data repositories. It will be appreciated by one of ordinary skill in the art that the number of sales associates concurrently using the system 200 may vary as desired. In the illustrated example, a first associate 210 may access the system 200 through any suitable device 20, such as a computer system 212, a smart phone 214, a tablet computer 216, or any other suitable known or yet to be developed communication device. In the disclosed example, the communication device 20 is capable of Internet browsing, textual transmission, and/or video transmission (e.g., video chat, video phone, etc), but it will be appreciated by one of ordinary skill in the art that the communication device may be any suitable communication device including any voice, email, and/or text communication with or without use of other transmission types.

Concurrently, in the illustrated example, a second sales associate 220 may also access the system 200 through any suitable device, such as a computer system 222, a smart phone 224, a tablet computer 226, or any other suitable known or yet to be developed communication device. Similar to the first user's devices, the communication devices 222, 224, 226 are each capable of Internet browsing, textual transmission, and/or video transmission (e.g., video chat, video phone, etc) as desired.

Each sales associate 210, 220 accesses the host server 68 through the network(s) 12. In this example, each associate 210, 220 accesses the system 68 through a separate network 12, but it will be appreciated that the network access may be architected in any suitable manner. Each of the network(s) 12 provides network routing utilizing a cloud based network, although any appropriate routing device (software, firmware, hardware, and/or the like) may be utilized. The connection between the user 210 and the user 220 may be through the network 12, through a social network 68', and/or through the host system 68.

The illustrated approach may take advantage of the convergence of mobile devices, IP telephony (e.g., VoIP, SIP, etc) and Internet application such as, for example, Facetime, Skype, etc. The example system 200 may also enable interactive communications amongst user across varied platforms, (e.g., iOS, Android, Windows, etc.), devices (e.g., Mobile phones, PCs, Macs, Tablets, etc), networks (e.g., Wi-Fi, 3G, 4G, etc.), and media (e.g., voice, text, video, etc).

For allowing a user to setup and/or manage all of their sales associate tasks, messages, research information, etc. the host server system 68 may make available to the sales associate one or more tools by which a sales associate can, for example, interact with graphical user interface elements to create, perform, manage and/or receive information such as sales data, point-of-sale interactivity, sales and/or marketing information, rewards information, credit information, manuals, retail store information, employment data and/or records, and/or any other suitable information.

By way of example only, FIG. 3 illustrates a screen shot of various management tools that may be provided to a sales associate at the user computer device 20 via the host system server 68. As illustrated, a sales associate management application 300 may include a sales associate area 302, by which a use can see information regarding the currently logged in sales associate, a logout selectable interface 304, which can be utilized to disconnect and/or deauthorize the device 20 from the server 68, a sales data area 306 to provide the sales associate with links to authorized sales data trends provided by the server 68, a listing area 308 providing a listing of sales associates logged into the system, an application area 310 proving a selectable listing and/or iconic view of available applications, and a navigation area 312 allowing quick navigation of various user interfaces as will be described herein. Additionally, any alerts, such as, for example any news alerts, may be displayed to the sales associate at an area 320 as illustrated in FIG. 4. It will be appreciated by one of ordinary skill in the art that these areas need not be displayed concurrently and/or in the exact manner as shown in FIG. 2 and that variations may be made as desired.

More particularly, once the user navigates to the sales associate management application 300 that is hosted in the host server system 68, a determination may be made as to whether or not the user is currently logged into the system as illustrated in FIG. 3. If the sales associate is not logged into the system and it is not indicated to the system that the user has otherwise previously used the sales associate management application 300, which indication may be stored in a cookie stored on the device 20, or may be provided as a dedicated device (e.g., permanently logged in as a specific user), the sales associate may be provided with a welcoming message and directed to the area 304 where the user may access a log-in procedure.

When the user is logged into the sales associate management application 300, the system may next determine the authorization level of the user by querying the server 68. Upon determination of the authorization level, the system may display different information to the sales associate. For example, as illustrated in FIG. 3, the sales associate is determined to be a manager at area 302. Accordingly, in this example, the area 308 may provide a listing of the associates reporting to the manager that are currently logged into the system. For example, login in as a manger may cause the server 68 to query the data repository 68A and/or any other suitable system component to determine the available sales associates currently logged into the system. It will be appreciated, however, that information provided to the user at the area 308 and/or any other area of the application 300 may be predetermined and/or otherwise defaulted based upon the authorization level of the user, and/or may be overwritten and/or other determined through user preferences set by the user and associated with the user log-in. In some example, the listing of sales associates may include a listing of all associated sales associates, with a visual indication on some and/or all users who are not currently logged into the system, such as graying-out, etc. As illustrated in FIG. 4, if the server 68 returns that the user of the application 300 is a sales associate reporting to a manager, the application 300 may display at the area 308 a listing of tasks assigned and/or other relevant information to the associate by a user of authority, such as for example the manager.

Figure 5:
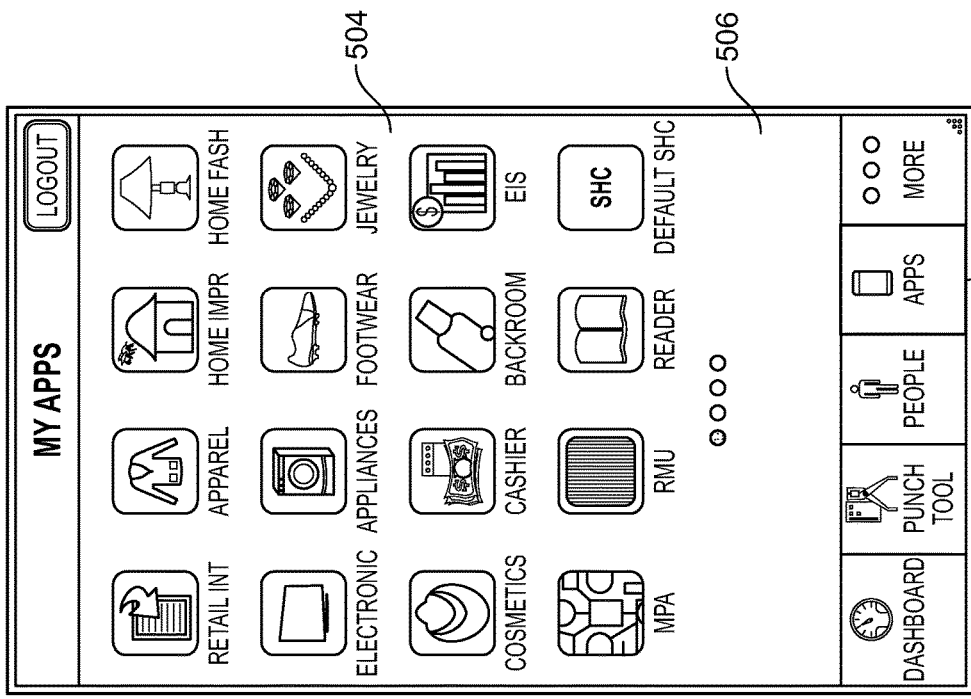
FIG. 5 illustrates an example method by which a user may view various applications associated with the user.

Referring now to FIG. 5, in order to provide various applications to the user, the system provides a menu of applications by selecting the area 502 in the navigation bar 312. By selecting the area 502, the server 68 queries the data repository 68A to determine the pre-set and/or customized applications available to the user. Alternatively, the applications may be stored on the device 20 itself, and the user may have global access and/or restricted access to the applications based upon their login credentials. In the example of FIG. 5, the applications are listed in the area 504 as thumbnail icons. It will be appreciated, however, by one of ordinary skill in the art that the method of displaying the applications may vary as desired including listing, etc. Additionally, the example area 504 includes a page indicator 506 to visually describe to the user what page the device is displaying in regard to the available applications. As can be appreciated, the applications displayed in the area 504 may be a inclusive and/or exclusive set of the applications provided for in the application area 310 shown in FIG. 3. While not shown in FIG. 5, the subject reference application is among the several "apps" to be displayed in the area 504.

Figure 6:
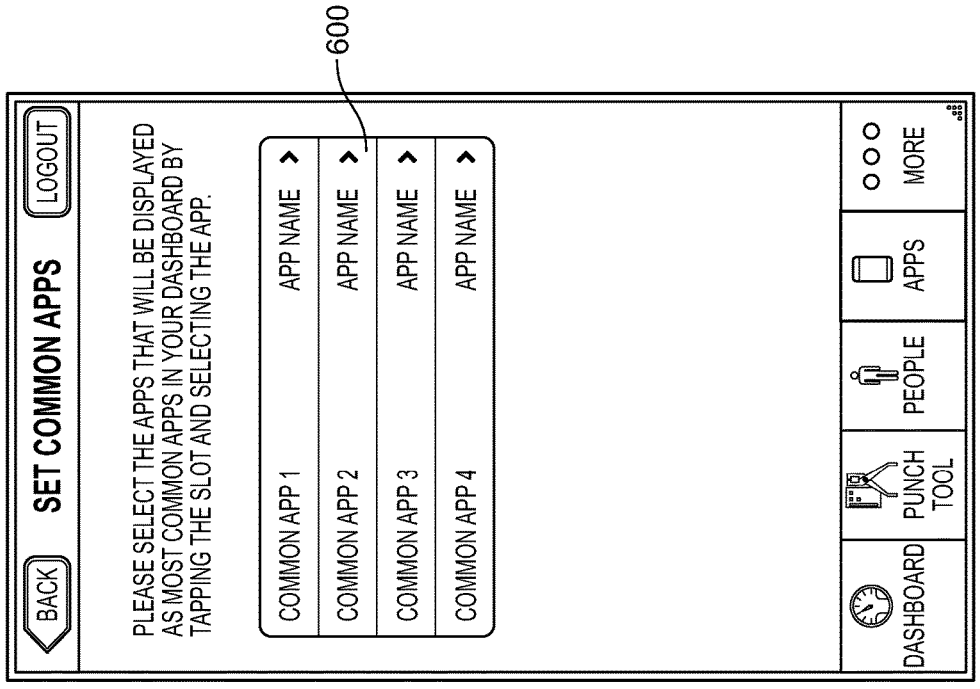
FIG. 6 illustrates an example method by which a user may customize the application layout of the example connect system disclosed herein.

Referring now to FIG. 6, there is illustrated an example interface 600 that may be used by the device 20 to cause the server 68 to modify the application and/or number of applications displayed to the user in the area 310 as illustrated in FIG. 3. In this way, the application may be truly customized to meet each of the sales associate's individual needs. Sales associates who use the reference application regularly would benefit from designating the reference application as a "common app" for ease of to be displayed in the area 310 as illustrated in FIG. 3.

Figure 7:
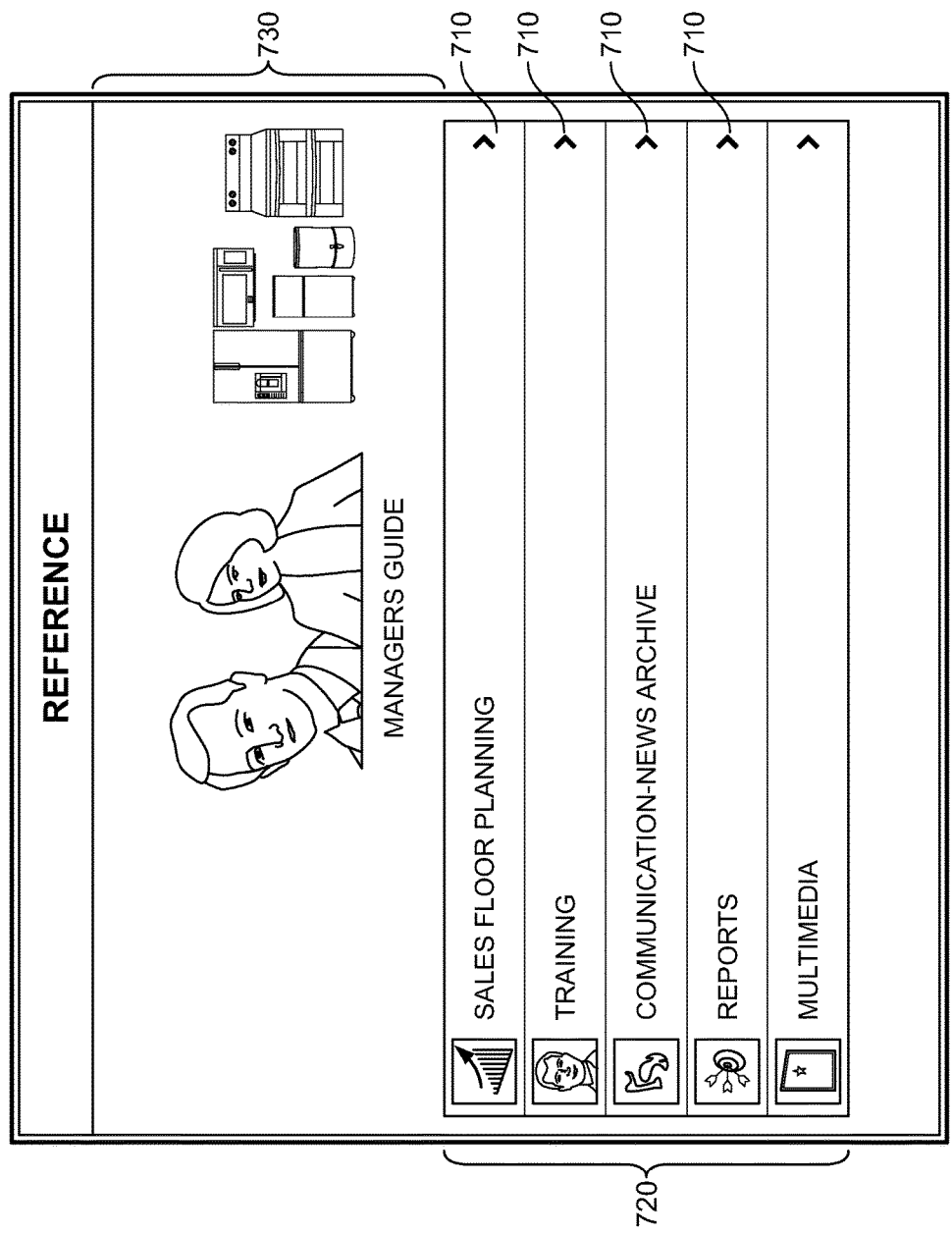
FIG. 7 illustrates an example method by which a user may be presented with a dashboard view of the reference application.
Figure 8:
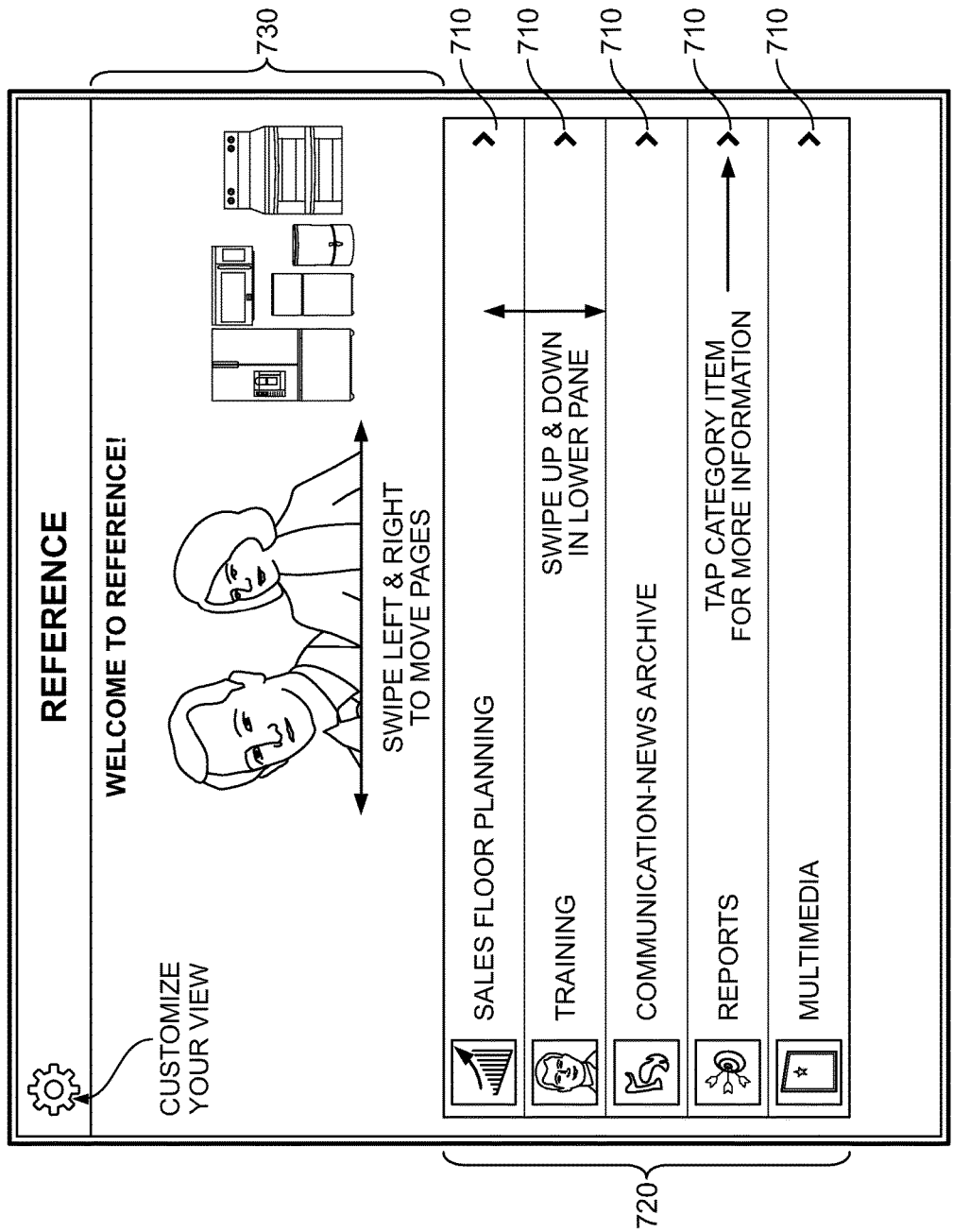
FIG. 8 illustrates an example method by which a user may control the dashboard view of the reference application.

Turning now to FIGS. 7-8, a dashboard view of the reference application is illustrated. From the dashboard, the user can select one of several menu options 710 in lower pane 720 by tapping one such option. As shown in FIG. 8, the user can also swipe upwards or downwards within the lower pane 720 to view additional menu options 710, or swipe leftwards or rightwards in the upper pane 730 to view additional options. Swiping up and down within the lower pane enables users to scroll through various departments, such as training, floor planning or news archives. "News" articles within the application may comprise updates to specific store departments or notices of current or upcoming sales, among other relevant information.

Figure 9:
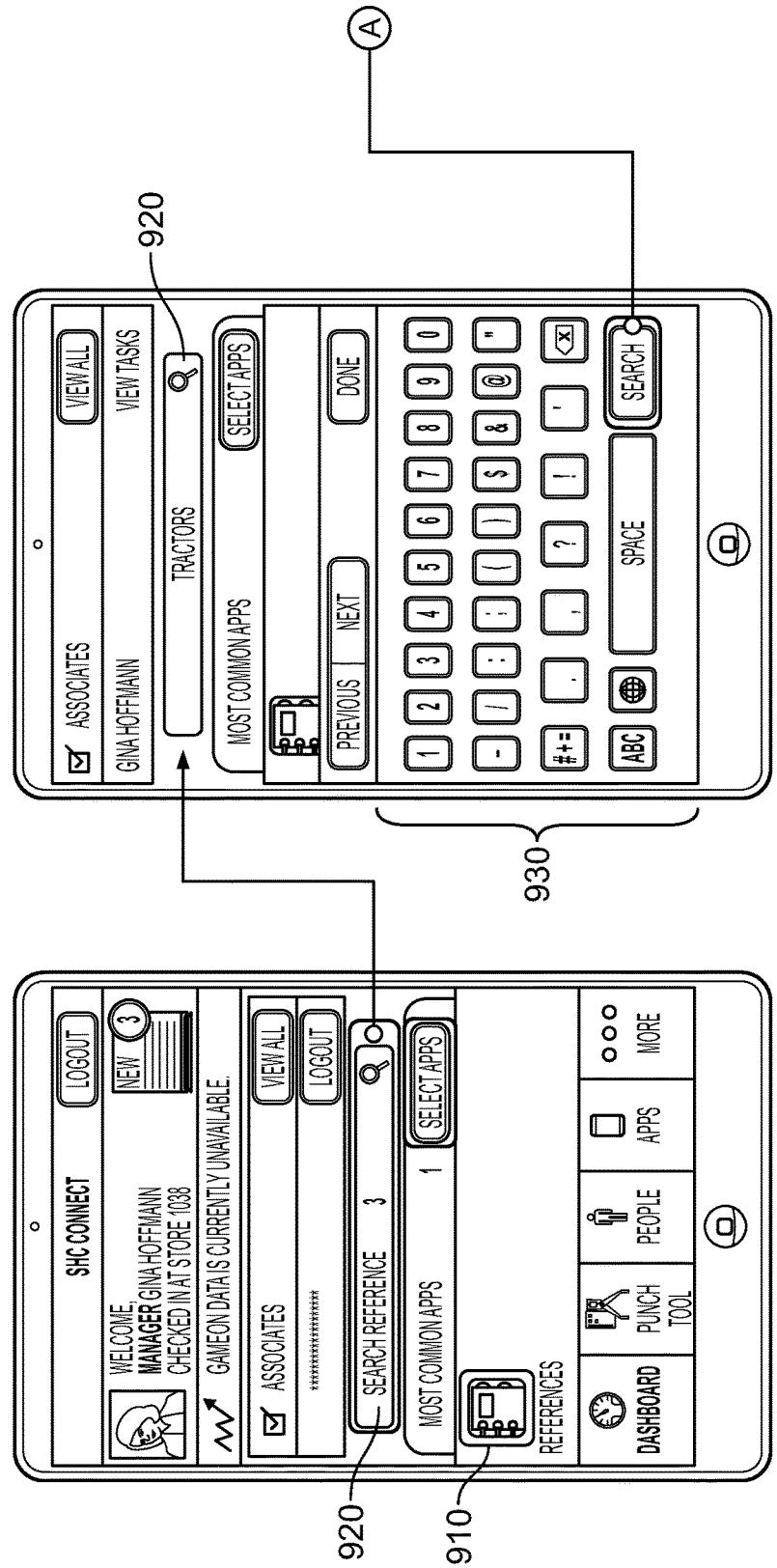
FIG. 9 illustrates an example method by which a user may search the reference application through the connect application FIGS. 10-12 each illustrate an example method by which a user may search the reference application for reference materials and information concerning products.

FIG. 9 demonstrates how a user can activate the reference application 910 from within the connect application. Once the user selects the reference application 910, the user can tap search bar 920, and a native keyboard 930 will appear. As the user begins entering text into search bar 920, frequently searched terms may appear to prompt the user to select recently or frequently searched reference materials. Search terms can vary broadly to widely access both general reference materials for given products (such as, for example, owner's manuals) as well as specific information about store inventories, sales, etc. Thus, potential search terms can include "footwear," "cosmetics," jewelry catalog," "sales today," and "stockroom," among others.

Once the user has entered text into search box 920, the host system server 68 can transmit such data 68A through the network 12 to the network interface 73, thereby enabling the application to search through reference materials which are stored in the system memory 24. The reference application returns several search results in the form of reference materials 940 which match the searched term, and also displays thumbnail previews 950 of such search results 940. Reference materials 940 may take the form of HTML or PDF documents, documents in other formats which may be dynamically converted to PDF format, or links to online videos. Once a user selects a specific reference material 945, the application opens and displays that reference material at step 960. In the case in which the reference material 945 is an online video, the application would open and play such online video at step 960, using any auxiliary application necessary for playing such online video.

Notably, a user can search for reference materials 940 using the document's title, text within the document, or through tags or metatags. Document titles are provided according to naming conventions which includes information on the relevant store department, product, and date of posting. By way of example, the file naming convention may take the form of DEPT_DESCRIPTOR_DATE.EXT, where "DEPT" refers to the store department, "DESCRIPTOR" relays descriptive information about the product and/or model number thereof, "DATE" refers to the date the document was uploaded, and "EXT" refers to the file extension. Thus, an example file name for the owner's manual for a riding lawn mower may be entitled LawnGarden_JohnDeere1600_05272012.pdf, where "LawnGarden" refers to the store department, "JohnDeere1600" refers to a make and model of a specific riding lawn mower, and "05272012" corresponds to the date on which the manual was uploaded, in this case, May 27, 2012. Such dates are important because the reference application contains notification processes to ensure that the reference materials and related content are current and relevant. Indeed, the reference materials 940 may incorporate additional date information within tags or metatags, such as expiration dates, to notify the user when a given reference material may no longer reflect the make or model currently sold in stores.

Turning now to FIGS. 10-11, there is illustrated a dashboard within the "Lawn and Garden" department of the reference application. Specifically, upper pane 1010 shows the "Lawn and Garden" department, though the user can swipe upper pane 1010 rightward for other departments, such as tools, tool storage, or consumer appliances. In lower pane 1020, the user can choose to search for product info, at button 1021, can view ongoing sales at button 1023 or can search for news or reports at buttons 1025 or 1026, respectively. Once the user selects button 1021 for product info, the user is taken to a Product Info page (not shown), where the user can choose from one of several products within the department listed. Once the user has selected from a list of products, that Product page is shown in FIG. 11 (in this case, the product is "Mowers"). From the Product page, a search box 1110 will appear, and the user can search for reference materials 1120, which will populate as the user enters text. As shown in FIG. 11, the application displays the title of reference materials 1120 alongside thumbnail previews 1130 for each such material. The application also contains a path hierarchy 1140, which incorporates "breadcrumb" functionality to enable users to return to any of the menus previously viewed within the current search.

Figure 12:
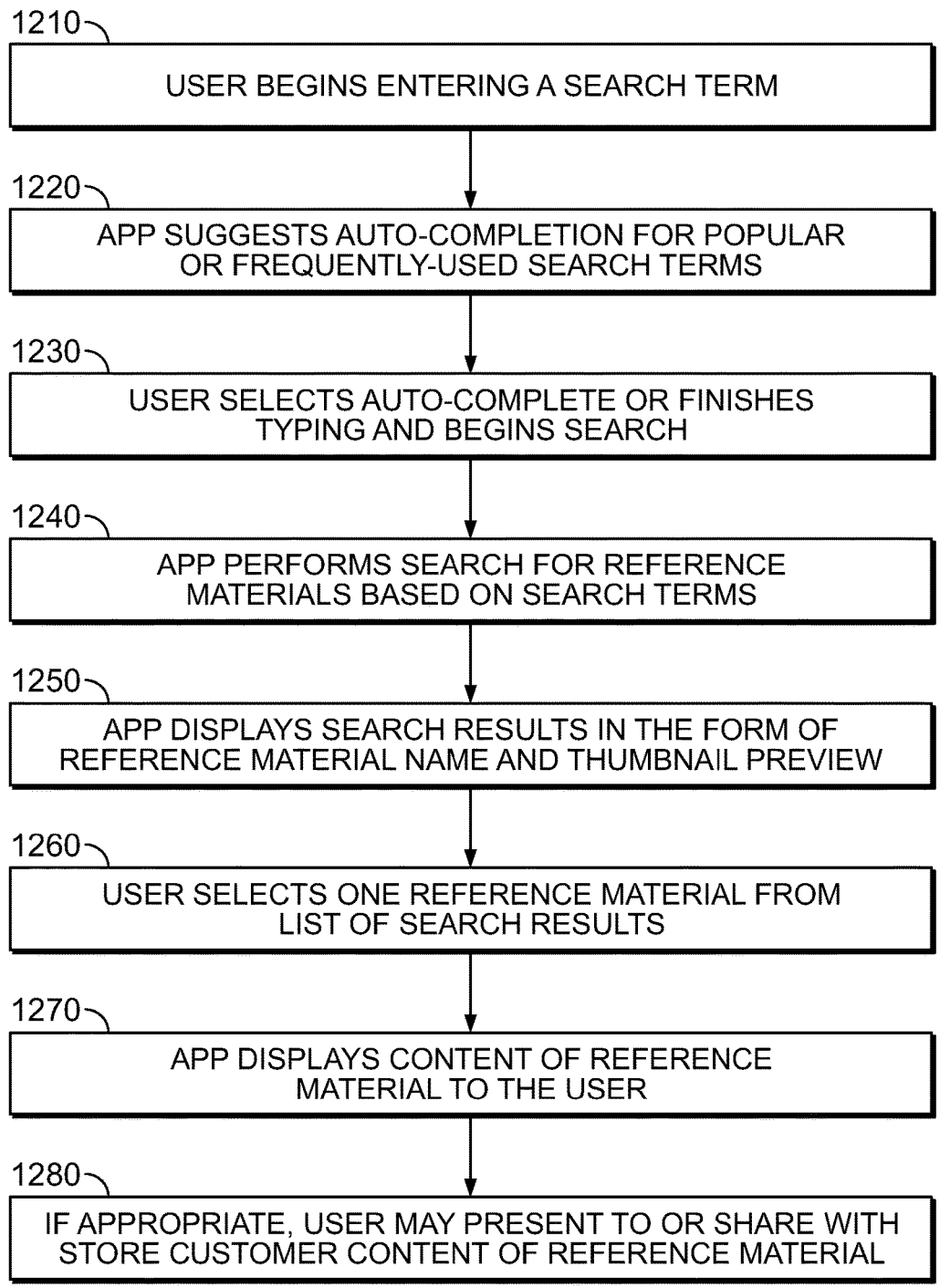

FIG. 12 reflects a flowchart illustrating how a user can identify reference materials to answer questions posted by customers and potentially share such reference materials with the store customer. At step 1210, a user has already opened the reference application and can begin by entering a search term into the search box as shown in FIGS. 9 and 11. As the user enters text, at step 1220, the application automatically suggests frequently-used search terms, which the user can either select or ignore at step 1230. At step 1240, the application performs the search, and displays the results of that search at step 1250, including the title of each reference material and a thumbnail preview thereof. The user can then select one of the reference materials at step 1260, and the application will retrieve and display the content of that reference material at step 1270, whether that reference material is a PDF document or an online video, in which case the application will pull up any auxiliary application necessary for displaying online videos. Finally, at step 1280 and only where appropriate, the user can show the reference material to the store customer, or the user may have the option of sharing such reference material with the store customer via email, Facebook, or other social media.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A non-transitory computer-readable storage media having stored thereon computer executable instructions, wherein the instructions perform steps for enabling a sales associate at a retail location to procure a variety of reference materials from a central server via a mobile wireless communication device, comprising:

hosting a database of reference materials and operational information regarding a retailer; and providing a first graphical user interface comprising graphical user interface elements configured to allow the sales associate at the retail location to access, using a communication network, a central server for the retailer, the graphical user interface elements configured to allow the sales associate to provide a mobile point-of-sale platform for purchases at the retail location, and the graphical user interface elements configured to provide the sales associate with enhanced sales activities by accessing multichannel processing and support systems through the mobile device, the central server allowing a plurality of additional sales associates at the retail location on a corresponding plurality of additional mobile devices to access the central server using a corresponding plurality of additional graphical user interfaces and a corresponding plurality of additional communication networks, wherein the mobile device is configured to leverage mobile technology, customer online social networking, customer rewards program, marketing or sales data, and the reference materials to enable the sales associate to provide a customized and personal shopping experience for one or more customers while enabling the sales associate to maintain mobility in the retail location, wherein the first graphical user interface and the plurality of additional graphical user interfaces are configured to cause the central server to query the database to return and display selected pages, responsive to the query, of the reference materials at one or more of the first graphical user interface and the plurality of additional graphical user interfaces at the retail location.

2. The non-transitory computer-readable storage media as defined in claim 1, wherein the first graphical user interface and the plurality of additional graphical user interfaces further cause the central server to query the database to return and display sales or inventory information for the retailer.

3. The non-transitory computer-readable storage media as defined in claim 1, wherein the reference materials comprise documents which are formatted in HyperText Markup Language ("HTML") or Portable Document Format ("PDF").

4. The non-transitory computer-readable storage media as defined in claim 1, wherein the reference materials comprise links to online videos, and wherein displaying the reference materials comprises running an auxiliary application capable of displaying online videos.

5. The non-transitory computer-readable storage media as defined in claim 1, wherein the first graphical user interface and the plurality of additional graphical user interfaces are provided on one or more of a mobile personal computer, a personal-digital assistant ("PDA"), a cellular telephone, a mobile device, a tablet, and an ereader.

6. The non-transitory computer-readable storage media as defined in claim 1, wherein the first graphical user interface and the plurality of additional graphical user interfaces cause the central server to query the database in response to an input received from one or both of the sales associate and the plurality of additional sales associates.

7. The non-transitory computer-readable storage media as defined in claim 6, wherein the input comprises at least one search term.

8. The non-transitory computer-readable storage media as defined in claim 7, wherein the at least one search term corresponds to a title of a reference material.

9. The non-transitory computer-readable storage media as defined in claim 7, wherein the at least one search term corresponds to a metatag assigned to a reference material.

10. The non-transitory computer-readable storage media as defined in claim 7, wherein the at least one search term corresponds to text found within a reference material.

11. The non-transitory computer-readable storage media as defined in claim 1, wherein displaying the reference materials further includes displaying a thumbnail preview of said reference materials.

12. The non-transitory computer-readable storage media as defined in claim 1, wherein at least one of the plurality of additional graphical user interfaces is of a type different from a type of the first graphical user interface.

13. The non-transitory computer-readable storage media as defined in claim 1, wherein the computer executable instructions comprise code for communicating at least a portion of the reference materials from the first graphical user interface to at least another graphical user interface using a social network.

14. The non-transitory computer-readable storage media as defined in claim 1, wherein the mobile point-of-sale platform includes an input configured for a camera or a scanner.

15. The non-transitory computer-readable storage media as defined in claim 1, wherein the mobile point-of-sale platform includes an output configured for a printer.

16. The non-transitory computer-readable storage media as defined in claim 1, wherein the graphical user interface elements are configured to allow the sales associate to manage or to receive rewards information.

17. The non-transitory computer-readable storage media as defined in claim 1, wherein the first graphical user interface is displayed using a touch screen interface.

18. The non-transitory computer-readable storage media as defined in claim 1, wherein the first graphical user interface is displayed on the mobile wireless communication device, wherein the first graphical user interface provides point-of-sale features to the sales associate including facilitating a purchase and facilitating a return.

19. The non-transitory computer-readable storage media as defined in claim 1, wherein the graphical user interface elements are configured to provide for chat functionality.

20. The non-transitory computer-readable storage media as defined in claim 1, wherein the mobile computing device is configured to leverage chat functionality and customer online social connections to enable the sales associate to provide the customized and personal shopping experience for the one or more customers while maintaining retail location mobility.

* * * * *